(12) United States Patent
Iguchi

(10) Patent No.: US 12,471,766 B2
(45) Date of Patent: Nov. 18, 2025

(54) ENDOSCOPE SYSTEM AND ENDOSCOPE

(71) Applicant: OLYMPUS MEDICAL SYSTEMS CORP., Tokyo (JP)

(72) Inventor: Kento Iguchi, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 389 days.

(21) Appl. No.: 18/105,958

(22) Filed: Feb. 6, 2023

(65) Prior Publication Data
US 2023/0255457 A1 Aug. 17, 2023

Related U.S. Application Data

(60) Provisional application No. 63/309,138, filed on Feb. 11, 2022.

(51) Int. Cl.
*A61B 1/018* (2006.01)
*A61B 1/005* (2006.01)
*A61B 1/05* (2006.01)

(52) U.S. Cl.
CPC ............ *A61B 1/018* (2013.01); *A61B 1/005* (2013.01); *A61B 1/05* (2013.01)

(58) Field of Classification Search
CPC ........ A61B 1/012; A61B 1/0125; A61B 1/018
See application file for complete search history.

(56) References Cited

U.S. PATENT DOCUMENTS

2015/0366434 A1* 12/2015 Tsuruta ................. A61B 1/005
606/34
2017/0123181 A1* 5/2017 Fujisawa ............ G02B 23/2476
2022/0225862 A1 7/2022 Onobori

FOREIGN PATENT DOCUMENTS

| JP | H10-248799 A | 9/1998 |
| JP | 2015-002861 A | 1/2015 |
| JP | 2021-053022 A | 4/2021 |

* cited by examiner

*Primary Examiner* — Alexandra L Newton
(74) *Attorney, Agent, or Firm* — Morgan, Lewis & Bockius LLP

(57) ABSTRACT

An endoscope includes an insertion portion configured to be inserted into a subject; a channel tube forming a first portion of a channel in the insertion portion, and a coil wound around at least a portion of the channel tube. The channel tube includes a first magnetic material, and the coil generates a magnetic field in response to a supplied electric current to magnetize the first magnetic material.

20 Claims, 5 Drawing Sheets

ENDOSCOPE SYSTEM AND ENDOSCOPE

RELATED APPLICATION DATA

This application is based on and claims priority under 35 U.S.C. § 119 to U.S. Provisional Application No. 63/309,138 filed on Feb. 11, 2022, the entire contents of which are incorporated herein by reference.

FIELD OF THE DISCLOSURE

The present disclosure relates to an endoscope in which a treatment instrument is inserted into a channel, and an endoscope system including the endoscope and the treatment instrument inserted into the channel of the endoscope.

BACKGROUND

An endoscope allows observation of an externally invisible region by inserting an elongated insertion portion into a subject and various treatments to be performed by inserting various treatment instruments into a treatment instrument channel of the insertion portion and using the treatment instruments projecting from an opening of the distal end portion.

For insertion of various treatment instruments, the inner diameter of the treatment instrument channel is set larger than a treatment instrument having the largest outer diameter among a plurality of treatment instruments used.

In an endoscope with the treatment instrument channel that also serves as a suction channel, the inner diameter of the treatment instrument channel is set large for efficient suction.

Japanese Patent Application Laid-Open Publication No. 2021-53022 discloses an overtube in which an endoscope having a small-diameter is inserted into an endoscope channel. With a permanent magnet disposed on each of the distal end side of the endoscope channel and the distal end side of the endoscope, the overtube and the endoscope are securely fixed together due to a magnetic attraction force.

Japanese Patent Application Laid-Open Publication No. H10-248799 discloses a tubular insertion assisting tool into which an endoscope is inserted. With a balloon disposed in the distal end portion of the insertion assisting tool and fluid injected into the balloon, the endoscope is securely fixed to the distal end portion of the insertion assisting tool.

Japanese Patent Application Laid-Open Publication No. 2015-2861 discloses an endoscope in which a wall surface of an insertion portion of the endoscope is provided with a spiral tube made of a soft magnetic material and an electromagnetic coil is wound around an operation cable inserted into the insertion portion. When an electric current is supplied to the electromagnetic coil, a magnetic force is generated in the electromagnetic coil, so that the operation cable is attracted to the spiral tube. Thus, the rigidity of the insertion portion increases. The endoscope having the insertion portion with variable rigidity is easily inserted into the large intestine, for example.

SUMMARY OF THE DISCLOSURE

An endoscope of an embodiment includes an insertion portion configured to be inserted into a subject; a channel tube forming a first portion of a channel in the insertion portion, and a coil wound around at least a portion of the channel tube. The channel tube includes a first magnetic material, and the coil generates a magnetic field in response to a supplied electric current to magnetize the first magnetic material.

DETAILED DESCRIPTION

First Embodiment

Figure 1:
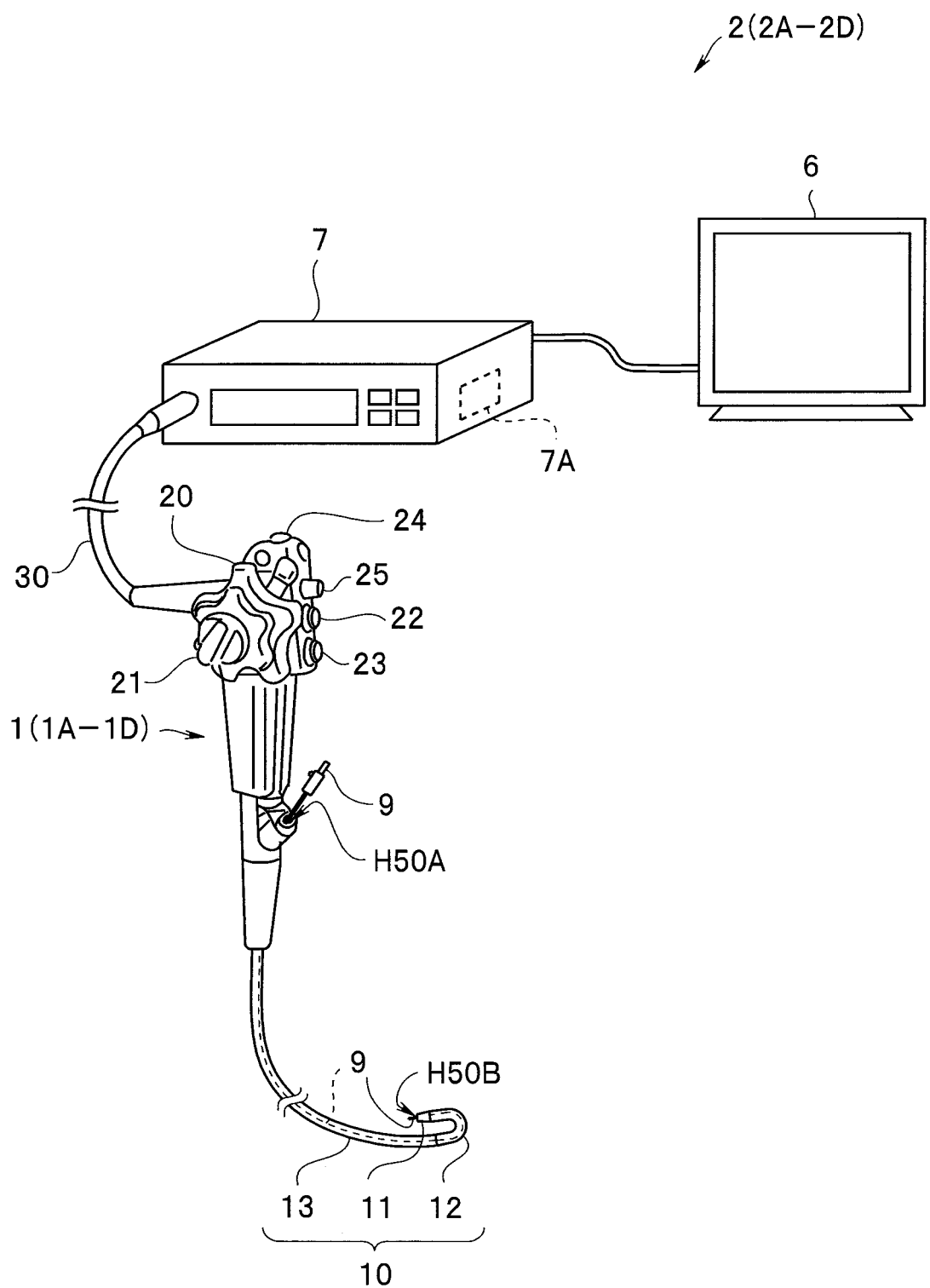
FIG. 1 is a perspective view of an endoscope system of an embodiment.

An endoscope 1 of the present embodiment shown in FIG. 1 constitutes an endoscope system 2, together with a treatment instrument 9, a processor 7 that is an external device, and a monitor 6.

Note that the drawings based on the embodiment are schematic drawings. The relation between the thickness and the width of each portion, the ratio in thickness of portions, and the like in the drawings are different from the actual relation, ratio, and the like. The dimensional relation or ratio of some portions included in the drawings are different among the drawings. Illustrations of and assignment of reference numerals to some components are omitted.

The endoscope 1 includes an insertion portion 10 to be inserted into a subject, an operation portion 20 provided on the proximal end side of the insertion portion 10, and a universal cord 30 extending from the operation portion 20.

In the insertion portion 10, a distal end portion 11, a bending portion 12 disposed on the proximal end side of the distal end portion 11, and a flexible tube 13 connecting the proximal end side of the bending portion 12 and the operation portion 20 are continuously provided. The distal end portion 11 includes, as a main member, a distal end structural member 11A made of resin or a rigid material such as metal.

The operation portion 20 includes a bending operation dial 21, an air and water feeding button 22, a suction button 23, and a plurality of operation switches 24 and 25. The bending portion 12 (bending section) bends in accordance with the turning of the bending operation dial 21.

The insertion portion 10 includes a treatment instrument channel 50 (see FIG. 2; hereinafter referred to as a "channel 50"). The operation portion 20 includes an insertion port H50A for introducing the treatment instrument 9 into the channel 50. The treatment instrument 9 is inserted into the channel 50 through the insertion port H50A of the endoscope 1, and the distal end of the treatment instrument 9 projects from a projecting port H50B that is an opening of the distal end portion 11.

The treatment instrument 9 includes an end effector 9A that performs treatment and a shaft body 9B provided at the rear end of the end effector 9A. The treatment instrument 9 is a biopsy forceps that collects tissue into a cup that is the end effector 9A. The treatment instrument 9 may be, for example, a high-frequency snare, a flower basket, a surgical energy device, or a manipulator.

The processor 7 includes a CPU. The processor 7 processes an image pickup signal outputted by an image pickup unit 40 and transmits an image signal to the monitor 6. The monitor 6 displays an endoscope image. The processor 7 includes a power source 7A that applies an electric current to a coil 60 (see FIG. 2) for magnetic field generation, which will be described later, of the endoscope 1. The power source 7A is configured to provide the supplied electric current to the coil 60. The user turns on and off the electric current to be applied to the coil 60 by means of the operation switch 24. The operation switch 24 may be a switch separate from the endoscope 1, for example, a foot switch. The power source 7A may also be an external power source separate from the processor 7.

<Configuration of the Distal End Portion>

Figure 2:
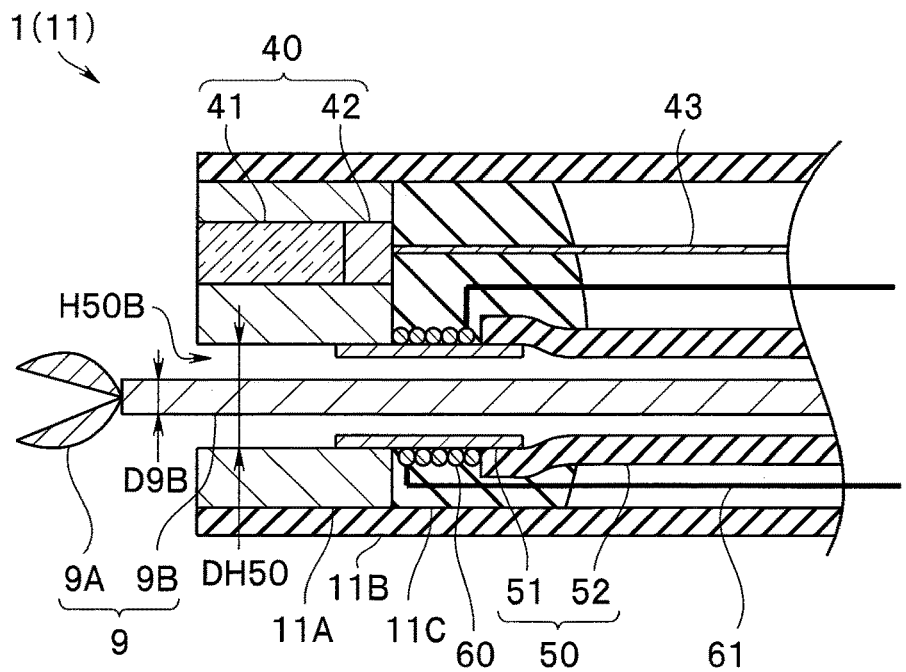
FIG. 2 is a cross-sectional view of a distal end portion of an endoscope of a first embodiment.

As shown in FIG. 2, the distal end structural member 11A as the main member of the distal end portion 11 of the endoscope 1 is made of stainless steel and is a substantially cylindrical rigid member including a plurality of holes. The image pickup unit 40, a lighting unit (not shown), and the like are disposed in the respective holes of the distal end structural member 11A with the side surface covered with an outer tube and a flexible resin 11B. The distal end face includes an opening for the hole that is the projecting port H50B of the channel 50 through which the treatment instrument 9 projects from the distal end structural member 11A. A sealing resin 11C is disposed on the proximal end side of the distal end structural member 11A.

The image pickup unit 40 includes an image sensor 42 that receives light of an object image condensed by an optical system 41. The optical system 41 is an optical element such as a lens. The image sensor 42 includes a CCD or the like. The image pickup unit 40 converts the object image into an image pickup signal by means of the image sensor 42 and transmits the image pickup signal to the processor 7 via a cable 43. A sensor is provided in the distal end section of the insertion portion 10, and a third soft magnetic material covers one or more of an outer periphery of the coil 60 and an outer periphery of the sensor. The sensor may be the image sensor 42.

The channel 50 includes a channel tube 52 made of a flexible fluorocarbon resin, fluorocarbon polymer or the like and a channel pipe 51 made of a soft magnetic body (first magnetic material) such as stainless steel. The channel pipe 51 couples the channel tube 52 and the distal end structural member 11A. In other words, the channel pipe 51 is disposed on the proximal end side of the holes of the distal end structural member 11A. The channel tube 52 forms a first portion of the channel 50 in the insertion portion 10. The channel pipe 51 may include the configuration and/or features of the channel tube 52 described hereafter.

The coil 60 is formed by winding a conductive wire around the outer periphery of the channel pipe 51. In other words, the channel pipe 51 is disposed on the inner side of the coil 60. The coil 60 is, for example, a copper wire coated with an insulator. Conductive wires 61 at the opposite ends of the coil 60 are connected to the power source 7A via the operation switch 24. The coil 60 is wound around at least a portion of the channel tube 52. The channel tube 52 includes the first magnetic material. The coil 60 generates a magnetic field in response to a supplied electric current to magnetize the first magnetic material. The first magnetic material is a first soft magnetic material.

The insertion portion 10 includes a distal end part forming a distal portion of the channel 50. The distal end part is a non-magnetic material. The non-magnetic material is a resin or a non-magnetic stainless steel, and the channel tube 52 is made of a soft magnetic stainless steel. The channel tube 52 is the first magnetic material made of resin containing the first soft magnetic material. The insertion portion 10 includes a distal end section and the bending section 12 coupled to a proximal end of the distal end section, the bending section 12 is located proximal to the distal end section. The bending section 12 is configured to be bent. The distal end section is configured not to be bent, and the first magnetic material of the channel tube 52 is in the distal end section. The first magnetic material is provided in the distal end section.

Figure 3:
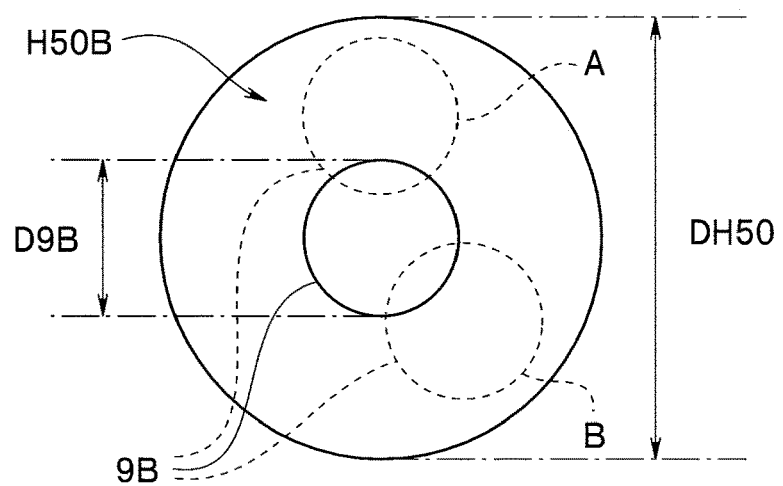
FIG. 3 is a planar view showing positional relation between a projecting port on a distal end face of the endoscope of the first embodiment and a shaft body of a treatment instrument.

As shown in FIG. 2, in the endoscope 1, an inner diameter DH50 of the channel 50 is larger relative to an outer diameter D9B of the shaft body 9B of the treatment instrument 9. Therefore, as shown in FIG. 3, the position of the treatment instrument 9 projecting from the projecting port H50B is unstable. In other words, for example, the shaft body 9B of the treatment instrument 9 positioned in a position A is shifted to a position B when the stress is applied to the end effector 9A or the proximal end side is manipulated.

In other words, in the endoscope having the inner diameter DH50 of the channel 50 larger than the outer diameter of the treatment instrument 9, it is occasionally difficult to guide the treatment instrument 9 to a target position. In the aforementioned endoscope, since the treatment instrument 9 projecting from the channel 50 swings and moves, there has occasionally been a difficulty in guiding the treatment instrument.

An object of the embodiment of the present disclosure is to provide an endoscope system with good operability and an endoscope with good operability.

Figure 4:
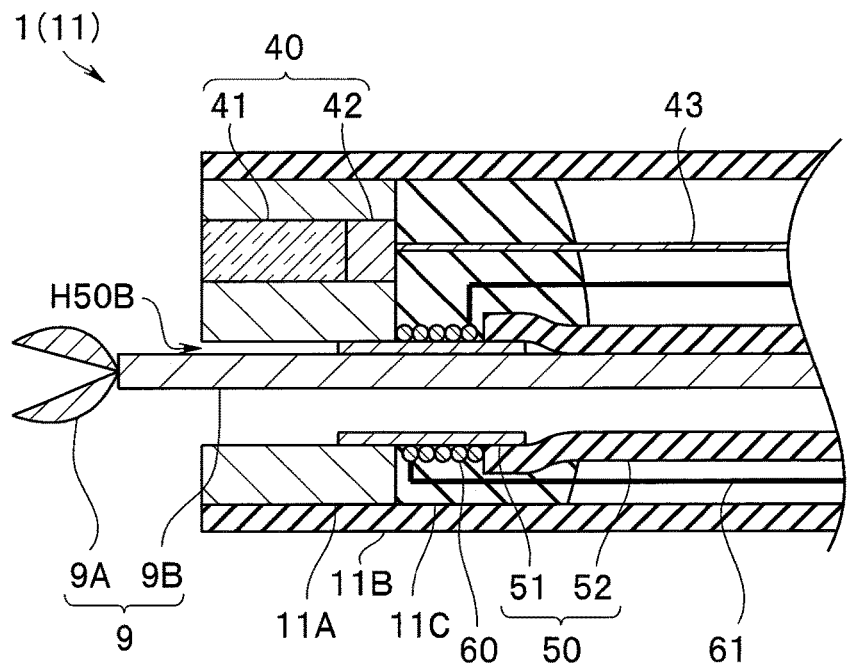
FIG. 4 is a cross-sectional view of the distal end portion of the endoscope of the first embodiment.

In the endoscope 1, when an operator operates the operation switch 24 so that an electric current is applied to the coil 60, the coil 60 generates a magnetic field. At this time, the treatment instrument 9 is drawn toward the channel pipe 51 magnetized by the magnetic field of the coil 60, as shown in FIG. 4, in a case where the treatment instrument 9 includes a soft magnetic body (second magnetic material). When the operator stops operating the switch 24 so that the electric current discontinues to flow through the coil 60, the attraction between the treatment instrument 9 and the channel pipe 51 is disengaged. The treatment instrument 9 is inserted into the channel 50. The treatment instrument 9 includes the second magnetic material, and the magnetic field is generated by the coil 60 magnetizes the second magnetic material. The magnetic field is generated by the coil 60 magnetizes the second magnetic material.

Figure 5A:
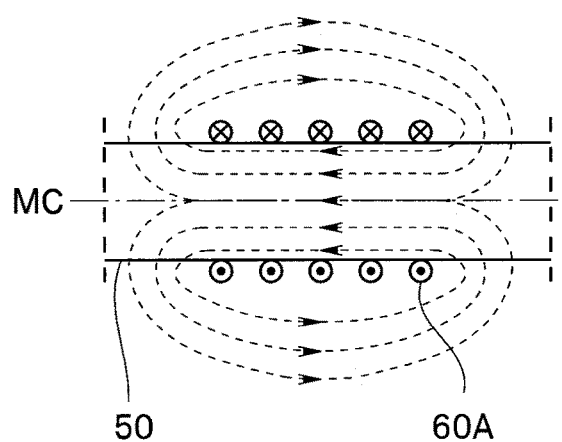
FIG. 5A is a view showing a magnetic field distribution of an air core solenoid coil.
Figure 5B:
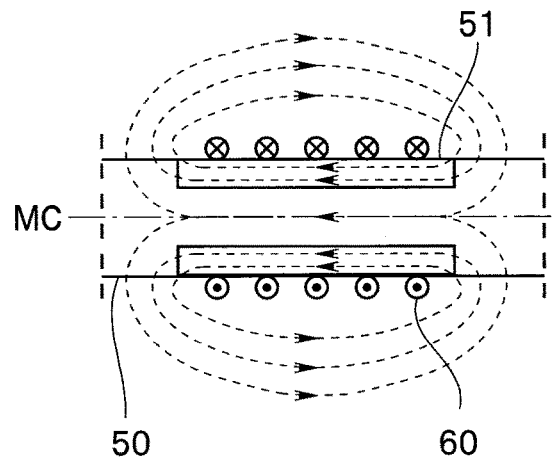
FIG. 5B is a view showing a magnetic field distribution of a solenoid coil including a soft magnetic body.

As shown in FIG. 5A, in an air core solenoid coil 60A, the magnetic flux density on the inner side of the coil is substantially uniform. In contrast, as shown in FIG. 5B, the magnetic flux density of the channel pipe 51 is greater than the magnetic flux density of a space on the inner side of the channel pipe 51. Specifically, the channel pipe 51 (member to be magnetized) is magnetized by the magnetic field of the coil 60. Therefore, the shaft body 9B of the treatment instrument 9 is drawn toward and attracted to the channel pipe 51.

Since the channel pipe 51 is tubular, the position where the shaft body 9B is attracted is not constant. For example, the shaft body 9B may be attracted to the position A or may be attracted to the position B, as shown in FIG. 3. However, the shaft body 9B does not easily move once the shaft body 9B is attracted.

The member to be magnetized to which the treatment instrument 9 is attracted is the distal end portion of the channel 50, that is, the channel pipe 51, and thus, the end effector 9A of the treatment instrument 9 projecting from the projecting port H50B is stably retained.

Thus, the endoscope 1 and the endoscope system 2 have good operability. In other words, according to the embodiment of the present disclosure, the endoscope system having good operability and the endoscope having good operability can be provided.

In particular, the inner diameter DH50 of the channel 50 may be more than double the outer diameter D9B of the shaft body 9B of the treatment instrument 9. The inner diameter DH50 of the channel 50 is more than double an outer diameter of the treatment instrument.

A soft magnetic body is a magnetic body that is easily magnetized by the external magnetic field and returns to the original state without remaining magnetic charges when the external magnetic field is eliminated. For example, the soft magnetic body may have a coercivity Hc of less than 200 A/m and a remanence Br of less than one tenth of a saturation magnetic flux density Bs.

The soft magnetic body is selected from stainless steel, permalloy (NiFeMo), sendust (FeSiAl), permendur (FeCo), soft ferrite (MnZn-based, NiZn-based), an amorphous magnetic alloy (FeSiB, CoFeSi), a nanocrystal magnetic alloy (FeCuNbSiB), and the like. The soft magnetic body may be stainless steel in terms of the corrosion resistance, biocompatibility, and the like. Stainless steel is an alloy containing iron as a main component (greater than 50 at %) and more than 10.5 at % chromium.

In particular, the soft magnetic body may be magnetic stainless steel having a nickel content of less than 3 at %. As the magnetic stainless steel, martensite stainless steel (SUS403, SUS410, etc.) or ferritic stainless steel (SUS430, SUS405, etc.) may be used, for example. The distal end part is made of a first stainless steel having a nickel content of more than 4 at %, and the channel tube 52 is made of a second stainless steel having a nickel content of less than 3 at %.

The channel pipe 51 and the treatment instrument 9 need not necessarily be the same stainless steel. For example, the channel pipe 51 may be SUS430 and the shaft body 9B may be SUS403. The channel pipe 51 as a member to be magnetized includes a soft magnetic body. For example, the member to be magnetized may be formed such that the outer surface of the channel pipe 51 made of soft magnetic stainless steel is coated with a non-magnetic resin layer. In other words, the magnetic permeability or the magnetic susceptibility of the coating is smaller than the magnetic permeability or the magnetic susceptibility of the channel pipe 51. The channel pipe 51 may include a hard resin in which soft magnetic powder is dispersed. An inner periphery of the channel tube 52 may be made of resin, and an outer periphery of the channel tube 52 may be made of the first soft magnetic material.

As long as the treatment instrument 9 includes a magnetic body, the treatment instrument 9 is attracted to the channel pipe 51 magnetized by the coil 60. In other words, as the magnetic body, at least one of a hard magnetic body or a soft magnetic body is included. However, in a case where the treatment instrument 9 includes the hard magnetic body, the magnetic charges occasionally remain in the treatment instrument 9, even after the coil 60 no longer generates the magnetic field. In this case, after the treatment is finished, the magnetic body member present in the periphery could be attracted to the treatment instrument 9. Thus, the magnetic body included in the treatment instrument 9 may be the soft magnetic body having a remanence Br greater than one tenth of a saturation magnetic flux density Bs.

When the end effector of the treatment instrument 9 is magnetized by the coil 60, the end effector 9A is occasionally attracted to the member to be magnetized. Therefore, in the treatment instrument 9, the shaft body 9B as part of the treatment instrument 9 may be a soft magnetic body and the end effector 9A as the distal end portion should be a non-magnetic body. The magnetic permeability or the magnetic susceptibility of the end effector 9A may be smaller than the magnetic permeability or the magnetic susceptibility of the shaft body 9B. The magnetic permeability or the magnetic susceptibility of the shaft body 9B may be smaller than the magnetic permeability or the magnetic susceptibility of the member to be magnetized. The treatment instrument includes the end effector 9A and the shaft body 9B coupled to the end effector 9A. The end effector 9A has a first magnetic susceptibility and a first magnetic permeability, the shaft body 9B has a second magnetic susceptibility and a second magnetic permeability. (i) The first magnetic susceptibility is smaller than the second magnetic susceptibility, or (ii) the first magnetic permeability is smaller than the second magnetic permeability, or (iii) the first magnetic susceptibility is smaller than the second magnetic susceptibility and the first magnetic permeability is smaller than the second magnetic permeability.

Meanwhile, the distal end structural member 11A may be stainless steel in terms of the corrosion resistance, biocompatibility, and the like. In particular, the magnetic permeability or the magnetic susceptibility of the distal end structural member 11A may be smaller than the magnetic permeability or the magnetic susceptibility of the channel pipe 51. In particular, the distal end structural member 11A may be a non-magnetic body. For example, the distal end structural member 11A may be made of non-magnetic stainless steel having a nickel content of more than 4 at %. For the non-magnetic stainless steel, austenitic stainless steel (SUS304, SUS316, etc.) may be used, for example. The second magnetic material is a second soft magnetic material. The distal end part connects to the channel tube 52, the distal end part has a first magnetic permeability and a first magnetic susceptibility, the channel tube 52 has a second magnetic permeability and a second magnetic susceptibility. (i) The second magnetic permeability is larger than the first magnetic permeability, or (ii) the second magnetic susceptibility is larger than the first magnetic susceptibility, or (iii) the second magnetic permeability is larger than the first magnetic permeability and the second magnetic susceptibility is larger than the first magnetic susceptibility. The shaft body 9B may be made of a soft magnetic stainless steel, and the end effector 9A may be made of a resin or a non-magnetic stainless steel.

Hereinafter, modifications of the embodiment and other embodiments will be described.

The modifications and the other embodiments are similar to the endoscope 1 and the endoscope system 2 of the first embodiment and include the same advantageous effects as the advantageous effects of the endoscope 1 and the endoscope system 2 of the first embodiment. Therefore, in the following descriptions, the components having the same functions as the functions of the endoscope 1 and the endoscope system 2 of the first embodiment are assigned the same reference numerals and the descriptions are omitted.

Modification 1 of the First Embodiment

Figure 6:
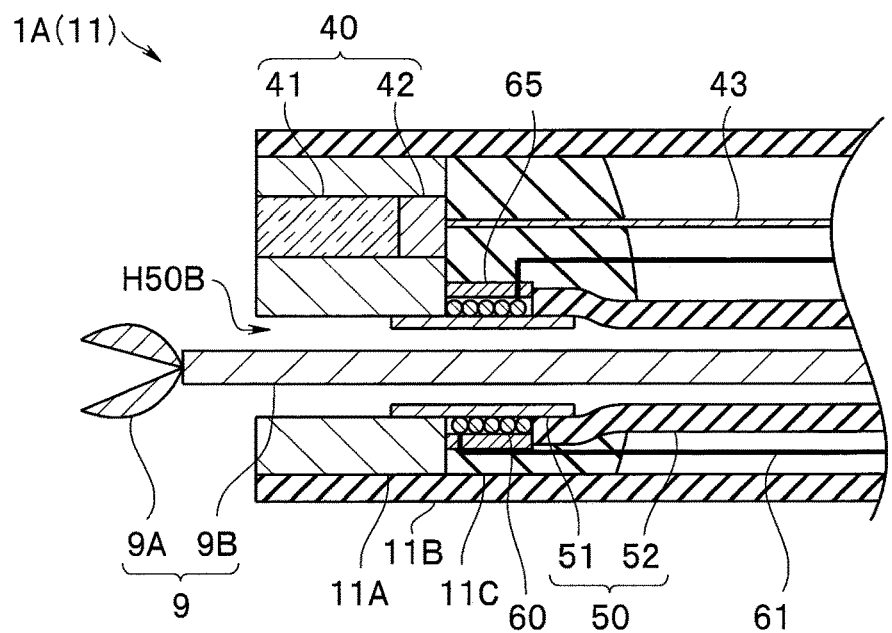
FIG. 6 is a cross-sectional view of a distal end portion of an endoscope of a modification 1 of the first embodiment.

As shown in FIG. 6, an endoscope 1A includes a magnetic shield member 65 made of a soft magnetic body that covers the outer periphery of the coil 60.

An electronic sensor such as the image sensor 42 occasionally generates noise or the like affected by the external magnetic field. In the endoscope 1A, the magnetic shield member 65 may prevent or suppress from passing through the magnetic field generated by the coil 60 to the image sensor 42, so that the effect on the electronic sensor can more be prevented or suppressed.

The thickness of the magnetic shield member 65 may be greater than 100 μm and less than 5 mm. For example, the thickness of the magnetic shield member 65 around which a ribbon of permalloy having a thickness of 100 μm is wound ten times is 1 mm.

Note that the magnetic shield member 65 may be formed by using resin containing soft magnetic particles, for example, non-conductive soft ferrite particles, as the sealing resin 11C. As a matter of course, as the magnetic shield member 65, for example, the soft magnetic ribbon wound around the outer periphery of the coil 60 and the sealing resin containing soft magnetic particles may concurrently be used.

It goes without saying that also in the endoscope with an electronic sensor, such as an accelerometer, disposed in the distal end structural member 11A, the magnetic shield member 65 can more surely prevent the effect of the magnetic field generated by the coil 60 on the sensor. The magnetic shield member 65 covers the coil 60, but may be provided so as to cover an electronic component, such as the image sensor 42.

Modification 1 of the Second Embodiment

Figure 7:
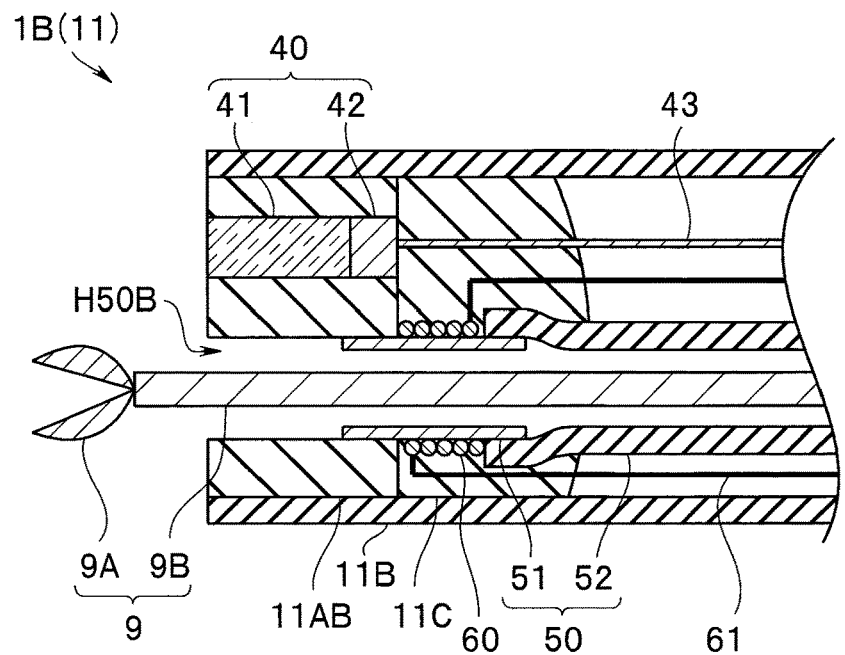
FIG. 7 is a cross-sectional view of a distal end portion of an endoscope of a modification 2 of the first embodiment.

As shown in FIG. 7, in an endoscope 1B of the present modification, a distal end structural member 11AB is a non-magnetic body made of resin. The distal end structural member 11AB is not magnetized due to the magnetic field generated by the coil 60, similarly to non-magnetic stainless steel. The distal end structural member 11AB made of resin is less expensive than the distal end structural member 11A made of stainless steel. Thus, the distal end structural member 11AB may be used particularly for a single-use endoscope, namely, a disposable endoscope.

Second Embodiment

Figure 8:
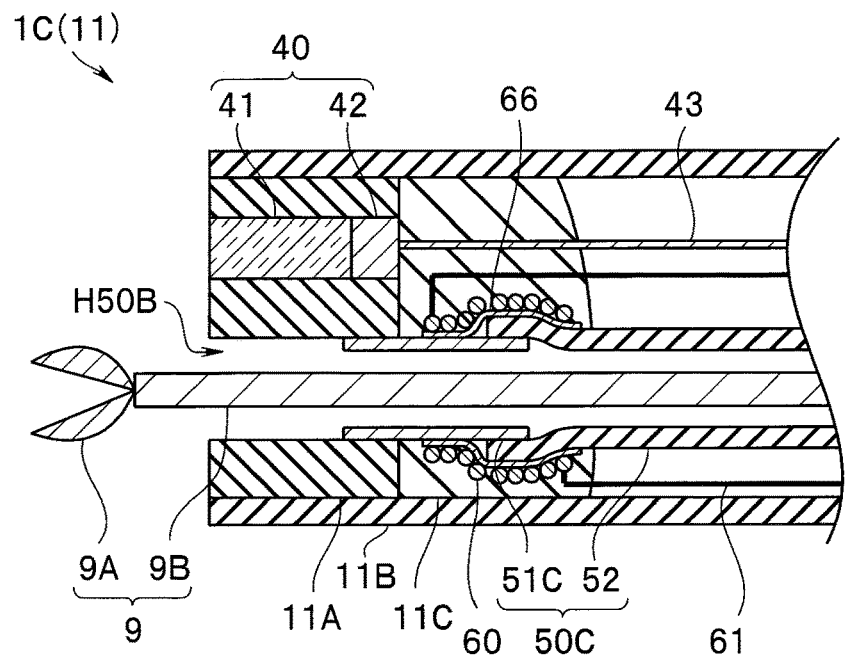
FIG. 8 is a cross-sectional view of a distal end portion of an endoscope of a second embodiment.

As shown in FIG. 8, in an endoscope 1C of the present embodiment, a tubular soft magnetic body 66 is disposed on the outer periphery of the distal end portion of a channel 50C. The soft magnetic body 66 is a member to be magnetized. For example, permalloy having a thickness of 100 μm covers the outer periphery of the channel 50C.

A channel pipe 51C is a non-magnetic body, for example, non-magnetic stainless steel or resin. The soft magnetic body 66 is provided so as to cover the distal end portion of the channel tube 52 and the channel pipe 51C.

The soft magnetic body 66 is disposed in at least one of the distal end portion of the channel tube 52 or the channel pipe 51C.

Third Embodiment

Figure 9:
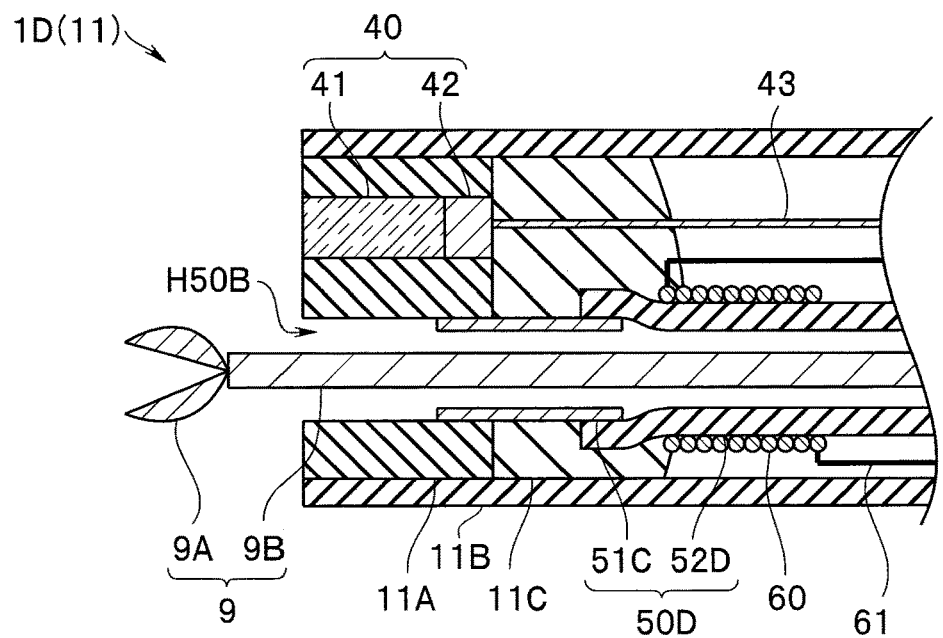
FIG. 9 is a cross-sectional view of a distal end portion of an endoscope of a third embodiment.

As shown in FIG. 9, in an endoscope 1D of the present embodiment, a channel tube 52D of a channel 50D is a member to be magnetized that is made of resin containing a soft magnetic body.

The channel tube 52D is made of resin containing a fluorocarbon resin or fluorocarbon polymer as the base material with permalloy fine particles dispersed in the base material.

The coil 60 is wound around the distal end portion of the channel tube 52D. The channel tube 52D may be formed such that only the distal end portion includes resin containing a soft magnetic body and the proximal end portion side includes resin that does not contain a soft magnetic body.

It goes without saying that endoscope systems 2A-2D including the endoscopes 1A-1D include the advantageous effects of the endoscope system 2 and further include the advantageous effects of the endoscopes 1A-1D.

Although the description of the member to be magnetized that is provided in the distal end portion has been made, the member to be magnetized may be provided in the entire insertion portion 10. However, the member to be magnetized may be provided in at least the distal end side relative to the bending portion 12 since the effect of the stress exerted on the shaft body 9B of the treatment instrument 9 can be reduced by the bending of the flexible tube 13 and the bending portion 12.

The endoscope 1 and the like described above are a flexible endoscope, but an endoscope of another embodiment may be a rigid endoscope including a rigid straight tube. An endoscope of another embodiment may also be a so-called side-viewing endoscope in which an image pickup unit performs photographing in a side surface direction. An endoscope of another embodiment may also have a treatment instrument projecting from the side surface of the distal end structural portion.

The present disclosure is not limited to the embodiment explained above. Various changes, alterations, and the like are possible within a range not changing the gist of the disclosure.

Example 1. An endoscope system comprising:
an endoscope including
an insertion portion that has a distal end structural member and that is configured to be inserted into a subject,
a channel disposed in the insertion portion and including a member to be magnetized having a magnetic body, and
a coil that is wound around the member to be magnetized;
a treatment instrument configured to be inserted into the channel so that a distal end of the treatment instrument projects from an opening of the distal end structural member, the treatment instrument partially including a magnetic body; and
a power source configured to supply an electric current to the coil.

Example 2. The endoscope system according to Example 1, wherein the magnetic body of the member to be magnetized is a soft magnetic body.

Example 3. The endoscope system according to Example 2, wherein the magnetic body of the treatment instrument is a soft magnetic body.

Example 4. The endoscope system according to Example 3, wherein
the channel comprises a channel tube and a channel pipe that couples the channel tube and the distal end structural member, and
the coil is wound around at least one of the channel tube or the channel pipe.

Example 5. The endoscope system according to Example 4, wherein the channel pipe is the member to be magnetized.

Example 6. The endoscope system according to Example 5, wherein magnetic permeability or magnetic susceptibility of the distal end structural member is smaller than magnetic permeability or magnetic susceptibility of the channel pipe.

Example 7. The endoscope system according to Example 6, wherein the distal end structural member is a non-magnetic body.

Example 8. The endoscope system according to Example 7, wherein
the distal end structural member is made of resin or non-magnetic stainless steel, and
the channel pipe is made of soft magnetic stainless steel.

Example 9. The endoscope system according to Example 7, wherein
the distal end structural member is made of stainless steel having a nickel content of more than 4 at %, and
the channel pipe is made of stainless steel having a nickel content of less than 3 at %.

Example 10. The endoscope system according to Example 2, wherein an inner diameter of the channel is more than double an outer diameter of the treatment instrument.

Example 11. The endoscope system according to Example 2, wherein
the treatment instrument comprises an end effector and a shaft body provided at a rear end of the end effector, and
magnetic susceptibility or magnetic permeability of the end effector is smaller than magnetic susceptibility or magnetic permeability of the shaft body.

Example 12. The endoscope system according to Example 11, wherein
the treatment instrument comprises an end effector and a shaft body provided at a rear end of the end effector,
the shaft body is made of soft magnetic stainless steel, and
the end effector is made of resin or non-magnetic stainless steel.

Example 13. The endoscope system according to Example 2, comprising:
a sensor provided in the distal end structural member; and
a magnetic shield member covering an outer periphery of the coil and made of a soft magnetic body.

Example 14. The endoscope system according to Example 13, wherein the sensor is an image sensor.

Example 15. The endoscope system according to Example 2, further comprising a switch configured to turn on and off an electric current applied to the coil.

Example 16. The endoscope system according to Example 4, wherein
the channel tube is made of resin, and
a soft magnetic body is provided, as the member to be magnetized, on an outer periphery of the channel tube.

Example 17. The endoscope system according to Example 4, wherein the channel tube is the member to be magnetized that is made of resin containing a soft magnetic body.

Example 18. The endoscope system according to Example 2, wherein
the insertion portion comprises a distal end portion including the distal end structural member and a bending portion formed on a proximal end side of the distal end portion, and
the magnetized member is provided in at least the distal end portion.

Example 19. The endoscope system according to Example 3, wherein magnetic permeability or magnetic susceptibility of the treatment instrument is smaller than magnetic permeability or magnetic susceptibility of the member to be magnetized.

Example 20. An endoscope comprising:
an insertion portion that has a distal end structural member including an opening through which a treatment instrument projects and that is configured to be inserted into a subject;
a channel disposed in the insertion portion and including a member to be magnetized having a magnetic body and into which the treatment instrument at least partially including a magnetic body is inserted; and
a coil that is wound around the member to be magnetized and to which an electric current is applied.

What is claimed is:

1. An endoscope, comprising:
an insertion portion configured to be inserted into a subject;
a channel tube forming a first portion of a channel in the insertion portion; and
a coil wound around at least a portion of the channel tube,
wherein the channel tube includes a first magnetic material at least partially located within an interior volume of the coil, and
wherein the coil generates a magnetic field in response to a supplied electric current to magnetize the first magnetic material.

2. The endoscope according to claim 1, wherein the first magnetic material is made of a first soft magnetic material.

3. The endoscope according to claim 2, wherein the insertion portion includes a distal end part forming a distal portion of the channel.

4. The endoscope according to claim 3, wherein the distal end part is a non-magnetic material.

5. The endoscope according to claim 4, wherein the non-magnetic material is a resin or a non-magnetic stainless steel, and
wherein the channel tube is made of a soft magnetic stainless steel.

6. The endoscope according to claim 4, wherein the distal end part is made of a first stainless steel having a nickel content of more than 4 at %, and
wherein the channel tube is made of a second stainless steel having a nickel content of less than 3 at %.

7. The endoscope according to claim 2, wherein an inner periphery of the channel tube is made of resin, and
wherein an outer periphery of the channel tube is made of the first soft magnetic material.

8. The endoscope according to claim 1, wherein the first magnetic material is made of resin containing the first soft magnetic material.

9. The endoscope according to claim 1, wherein the insertion portion includes a distal end section and a bending section,
wherein the bending section is located proximal to the distal end section, and wherein the first magnetic material of the channel tube is in the distal end section.

10. The endoscope according to claim 9, wherein the bending section is configured to be bent, and
wherein the distal end section is configured not to be bent.

11. An endoscope system, comprising:
an endoscope including an insertion portion configured to be inserted into a subject, a channel tube forming a first portion of a channel in the insertion portion, and a coil wound around at least a portion of the channel tube, wherein the channel is configured for insertion of a treatment instrument, wherein the channel tube includes a first magnetic material, and wherein the coil generates a magnetic field in response to a supplied electric current to magnetize the first magnetic material; and
the treatment instrument inserted into the channel,
wherein the treatment instrument includes a second magnetic material, and
wherein the magnetic field generated by the coil magnetizes the second magnetic material.

12. The endoscope system according to claim 11, wherein the first magnetic material is a first soft magnetic material.

13. The endoscope system according to claim 12, wherein the second magnetic material is a second soft magnetic material,
wherein the insertion portion includes a distal end part,
wherein the distal end part connects to the channel tube,
wherein the distal end part has a first magnetic permeability and a first magnetic susceptibility,
wherein the channel tube has a second magnetic permeability and a second magnetic susceptibility, and
wherein (i) the second magnetic permeability is larger than the first magnetic permeability, or (ii) the second magnetic susceptibility is larger than the first magnetic susceptibility, or (iii) the second magnetic permeability is larger than the first magnetic permeability and the second magnetic susceptibility is larger than the first magnetic susceptibility.

14. The endoscope system according to claim 12, further comprising:
a sensor provided in a distal end section of the insertion portion, and
a third soft magnetic material covering one or more of an outer periphery of the coil and an outer periphery of the sensor.

15. The endoscope system according to claim 14, wherein the sensor is an image sensor.

16. The endoscope system according to claim 11, wherein an inner diameter of the channel is more than double an outer diameter of the treatment instrument.

17. The endoscope system according to claim 11, wherein the treatment instrument includes an end effector and a shaft body coupled to the end effector,
wherein the end effector has a first magnetic susceptibility and a first magnetic permeability,
wherein the shaft body has a second magnetic susceptibility and a second magnetic permeability, and
wherein (i) the first magnetic susceptibility is smaller than the second magnetic susceptibility, or (ii) the first magnetic permeability is smaller than the second magnetic permeability, or (iii) the first magnetic susceptibility is smaller than the second magnetic susceptibility and the first magnetic permeability is smaller than the second magnetic permeability.

18. The endoscope system according to claim 11, wherein the treatment instrument includes an end effector and a shaft body coupled to the end effector,
wherein the shaft body is made of a soft magnetic stainless steel, and
wherein the end effector is made of a resin or a non-magnetic stainless steel.

19. The endoscope system according to claim 11, wherein the first magnetic material has a first magnetic susceptibility and a first magnetic permeability,
wherein the second magnetic material has a second magnetic susceptibility and a second magnetic permeability, and
wherein (i) the first magnetic permeability is larger than the second magnetic permeability, or (ii) the first magnetic susceptibility is larger than the second magnetic susceptibility, or (iii) the first magnetic permeability is larger than the second magnetic permeability and the first magnetic susceptibility is larger than the second magnetic susceptibility.

20. The endoscope system according to claim 11, further comprising:
a power source configured to provide the supplied electric current to the coil.

* * * * *